(12) United States Patent  
Gauthier et al.

(10) Patent No.: US 8,262,827 B2
(45) Date of Patent: Sep. 11, 2012

(54) LEATHER LAMINATED DECORATIVE PANEL

(75) Inventors: Sylvie Gauthier, Shelton, CT (US); George Tsangarides, Meriden, CT (US)

(73) Assignee: Panolam Industries International, Inc., Shelton, CT (US)

( * ) Notice: Subject to any disclaimer, the term of this patent is extended or adjusted under 35 U.S.C. 154(b) by 0 days.

(21) Appl. No.: 12/962,333

(22) Filed: Dec. 7, 2010

(65) Prior Publication Data

US 2011/0073245 A1    Mar. 31, 2011

Related U.S. Application Data

(62) Division of application No. 10/762,104, filed on Jan. 20, 2004, now abandoned.

(60) Provisional application No. 60/441,889, filed on Jan. 22, 2003.

(51) Int. Cl.
B32B 38/06 (2006.01)

(52) U.S. Cl. .......................... 156/219; 156/289; 156/323

(58) Field of Classification Search .................. 156/219, 156/289, 323
See application file for complete search history.

(56) References Cited

U.S. PATENT DOCUMENTS

| | | | | |
|---|---|---|---|---|
| 1,672,537 A | | 6/1928 | Novak | 428/217 |
| 2,361,296 A | * | 10/1944 | Kennedy | 156/77 |
| 2,622,991 A | | 12/1952 | Heinrich | 427/256 |
| 2,946,713 A | * | 7/1960 | Dusina, Jr. et al. | 264/413 |
| 3,391,056 A | | 7/1968 | Robinson, Jr. | 161/232 |
| 3,398,042 A | | 8/1968 | Odenthal | 161/290 |
| 3,475,267 A | | 10/1969 | Miles | 161/203 |
| 3,661,672 A | | 5/1972 | McQuade, Jr. | 156/220 |
| 3,674,619 A | * | 7/1972 | Scher et al. | 428/164 |
| 3,698,978 A | | 10/1972 | McQuade, Jr. | 156/219 |
| 3,700,537 A | | 10/1972 | Scher | 428/138 |
| 3,869,310 A | | 3/1975 | Fukushima et al. | 427/333 |
| 3,914,479 A | | 10/1975 | Yamagata et al. | 427/389.9 |
| 3,929,545 A | | 12/1975 | Van Dyck et al. | 156/220 |
| 4,132,821 A | | 1/1979 | Hiers et al. | 428/151 |
| 4,154,882 A | | 5/1979 | Ungar et al. | 428/165 |
| 4,255,480 A | | 3/1981 | Scher et al. | 428/208 |
| 4,297,408 A | | 10/1981 | Stead et al. | 428/240 |
| 4,311,748 A | | 1/1982 | Casey et al. | 428/204 |
| 4,473,613 A | | 9/1984 | Jaisle et al. | 428/220 |
| 4,864,790 A | | 9/1989 | Liardet | 52/311 |
| 4,880,689 A | | 11/1989 | Park et al. | 428/143 |
| 5,344,692 A | | 9/1994 | Schmock | 428/161 |
| 5,484,646 A | | 1/1996 | Mann | 428/198 |
| 5,534,327 A | | 7/1996 | Nishi et al. | 428/151 |

(Continued)

FOREIGN PATENT DOCUMENTS

| | | | |
|---|---|---|---|
| DE | 44 47 171 A1 | 7/1996 | |
| DE | 19815115 | 10/1999 | 13/2 |
| DE | 19920915 | 11/2000 | 21/4 |
| EP | 1072398 | 1/2001 | |
| FR | 2693149 | 1/1995 | |
| WO | WO 00/13897 | 3/2000 | |
| WO | WO 01/03927 | 1/2001 | |
| WO | WO 01/76854 | 10/2001 | 70/68 |

*Primary Examiner* — Khanh P Nguyen
*Assistant Examiner* — Margaret Squalls
(74) *Attorney, Agent, or Firm* — O'Shea Getz P.C.

(57) ABSTRACT

A heat and pressure consolidated laminate, and method for producing the same, is provided that includes in superimposed relationship a decorative layer consisting essentially of a leather material, an underlay layer, a substrate, and an optional backer layer. The substrate has a first surface and a second surface opposite one another. The underlay layer includes one or more cellulosic sheets impregnated with a thermosetting resin, and is disposed between the decorative layer and the first layer of the substrate. The backer layer includes one or more cellulosic sheets impregnated with a thermosetting resin, and is disposed contiguous with the second surface of the substrate.

10 Claims, 1 Drawing Sheet

U.S. PATENT DOCUMENTS

| | | | |
|---|---|---|---|
| 5,811,122 A | 9/1998 | Schlup et al. | 424/473 |
| 6,099,938 A | 8/2000 | Stoyanovich | 428/151 |
| 6,324,809 B1 | 12/2001 | Nelson | 52/592.2 |
| 6,395,408 B1 | 5/2002 | Nelson et al. | 428/690 |
| 6,423,167 B1 | 7/2002 | Palmer et al. | 156/209 |
| 6,440,538 B1 | 8/2002 | Ungar | 428/195.1 |
| 6,558,799 B2 | 5/2003 | Takeuchi et al. | 428/423.1 |
| 6,623,851 B1 | 9/2003 | Kaplan et al. | |
| 6,632,507 B2 | 10/2003 | Benton et al. | 428/141 |
| 7,179,538 B2 | 2/2007 | Gauthier et al. | 428/473 |
| 2001/0046590 A1 * | 11/2001 | Benton et al. | 428/156 |

\* cited by examiner

LEATHER LAMINATED DECORATIVE PANEL

This application is a divisional of U.S. patent application Ser. No. 10/762,104 filed Jan. 20, 2004, which claims the benefit of and priority from U.S. Provisional Patent Application Ser. No. 60/441,889, filed 22 Jan. 2003, which are hereby incorporated by reference in their entireties.

FIELD OF THE INVENTION

The present invention relates to thermally fused decorative laminates in general and, more particularly, to thermally fused decorative panels having a leather or leather-like material as a decorative layer. In addition, the present invention relates to a method for manufacturing the same.

BACKGROUND INFORMATION

Thermally fused decorative panels are often used in the construction of cabinetry, furniture, and other building products. There is considerable consumer demand for thermally fused decorative panels in a wide variety of colors, patterns, and textures. Natural leather is another popular material used in the construction of furniture and other applications. Leather is generally perceived as a quality material used in high-end applications. Unfortunately, leather and other natural skins can be difficult to work with because of size limitations, shrinkage, natural imperfections, etc. It would be useful, therefore, to provide a product that facilitates the incorporation of leather into applications including furniture, cabinetry, and the like.

DISCLOSURE OF THE INVENTION

According to an embodiment of the present invention, a heat and pressure consolidated laminate ("thermally fused decorative panel") is provided that comprises in superimposed relationship a decorative layer consisting essentially of a leather material, an underlay layer, a substrate, and an optional backer layer. The substrate has a first surface and a second surface opposite one another. The underlay layer includes one or more cellulosic sheets impregnated with a thermosetting resin, and is disposed between the decorative layer and the first layer of the substrate. The backer layer includes one or more cellulosic sheets impregnated with a thermosetting resin, and is disposed contiguous with the second surface of the substrate.

The decorative layer includes a leather material. The "leather" referred to herein is an animal hide and is not limited to any particular type of animal. Preferably, the leather material is bonded leather. The term "bonded leather" as used herein refers to a leather product that comprises leather shavings made from scrap and/or recycled leather. The shavings are processed into a sheet product using bonding agents. Bonded leather is commercially available and will not, therefore, be further described herein. A leather sheet thickness in the range of about 0.2 mm to about 4.0 mm is acceptable for most applications. A sheet thickness of about 0.2 mm to about 0.8 mm has particular utility. Although leather with an embossed finished surface can be used, it is preferable to use leather that initially has a smooth surface. Textures and other design features can be imparted to the laminate during the manufacturing process as will be explained in greater detail below.

In some embodiments, the present leather laminated decorative panel further includes an overlay disposed on the side of the decorative leather sheet opposite the substrate.

In some embodiments of the present invention, the leather laminated decorative panel includes a second decorative leather layer in place of the backer layer.

These and other objects, features, and advantages of the present invention will become apparent in light of the drawings and detailed description of the present invention provided below.

DETAILED DESCRIPTION OF THE INVENTION

Figure 1:
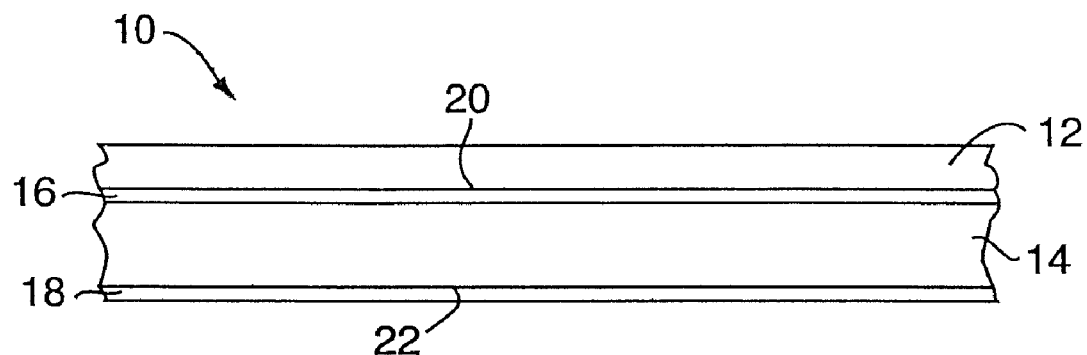
FIG. 1 is a diagram illustrating the superimposed constituent layers of the present leather laminated decorative panel.
Figure 2:
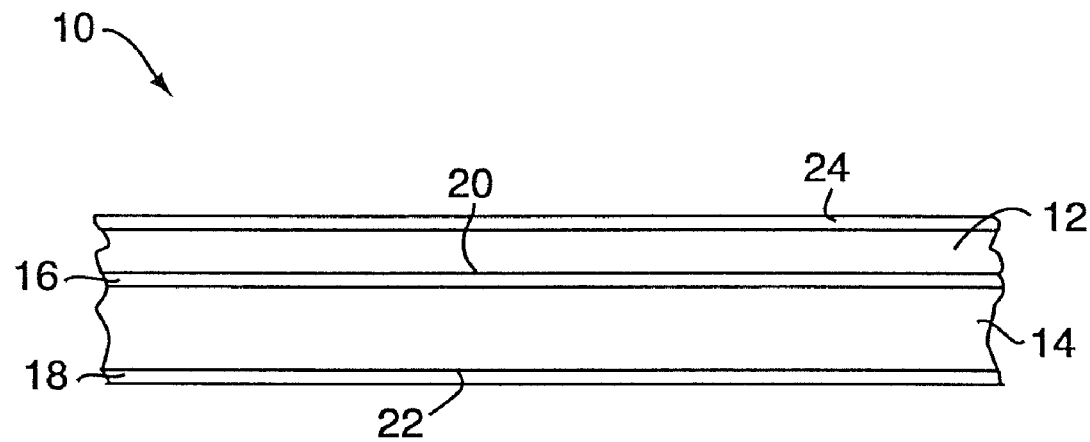
FIG. 2 is the present leather laminated decorative panel shown in FIG. 1, now including an overlay layer.
Figure 3:
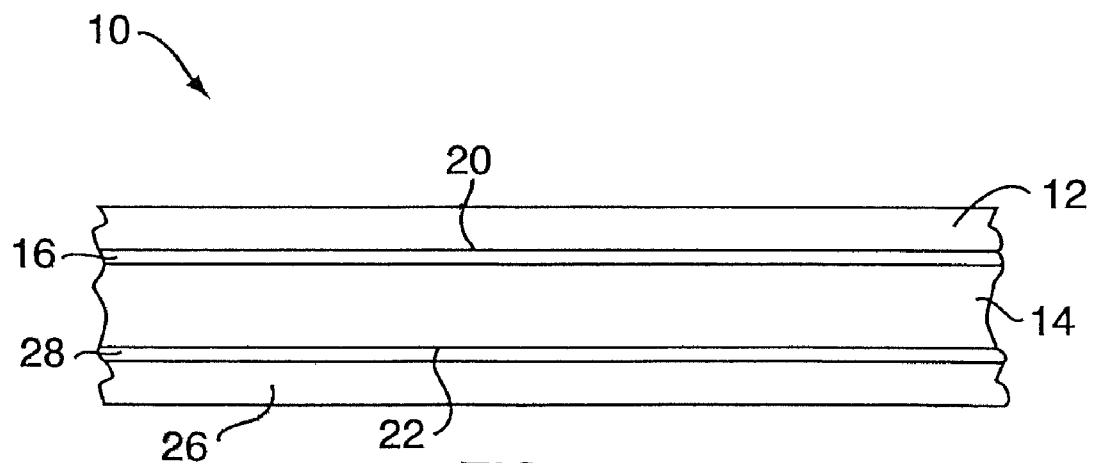
FIG. 3 is a diagram illustrating the superimposed constituent layers of the present leather laminated decorative panel, including a second decorative layer in place of the backing layer.

Now referring to FIGS. 1-3, the present invention leather laminated decorative panel is generally represented by reference numeral 10. The leather laminated decorative panel 10 includes a decorative layer 12, an underlay 16, a substrate 14, and an optional backer layer 18.

The decorative layer 12 includes a leather material as described above. A leather sheet thickness in the range of about 0.2 mm to about 4.0 mm is acceptable for most applications. A sheet thickness of about 0.2 mm to 0.8 mm has particular utility.

The underlay layer 16 is of known construction, consisting of paper, woven fabrics, mats, felts, or the like. The preferred underlay layer 16 consists of one or more cellulosic sheets impregnated with a laminating resin. Any of the conventional laminating resins commonly used for an underlay layer 16, such as a phenolic, melamine, amino, epoxy, and polyester resin, to name a few, may be used to impregnate the underlay 16. The preferred laminating resin for the underlay sheets is a beta-staged melamine formaldehyde resin. Resins of this type can be purchased commercially or prepared according to conventional procedures.

In an alternative embodiment, the underlay layer 16 may be eliminated by utilizing a thermally activated backer attached to the surface of the decorative leather layer facing the substrate 14. Leather material utilizing a thermally activated backer is commercially available.

The substrate 14 includes a first surface 20 and a second surface 22, opposite one another. The material comprising the substrate 14 can be varied to suit the application. Acceptable substrate materials include particle board, fiber board, plywood, or the like having surfaces to which the underlay resin and backing sheet resin can bond. The surfaces 20,22 preferably are smooth. A preferred substrate material for many applications is medium density fiberboard ("MDF").

The backer layer 18 is of known construction, consisting of paper, woven fabrics, mats, felts, or the like. The preferred backer layer 18 consists of one or more cellulosic sheets impregnated with a laminating resin such as a melamine formaldehyde type resin. Backing sheets of this type can be purchased commercially or prepared according to conventional procedures.

Referring to FIG. 2, in some embodiments the present leather laminated decorative panel 10 further includes an overlay 24 disposed on the side of the leather decorative layer 12 opposite the underlay layer 16 and substrate 14. The overlay 24 may, for example, consist of a high-quality alpha cellulose paper impregnated with a melamine formaldehyde resin. The alpha-cellulose paper acts as a translucent carrier for the resin, imparts strength to the resin, facilitates maintaining a uniform resin thickness and provides additional abrasion resistance to the leather decorative layer 12.

Referring to FIG. 3, in an alternative embodiment the present leather laminated decorative panel 10 includes the above-described decorative layer 12, underlay layer 16, and substrate 14. In place of the backer layer 18, however, this embodiment includes a second decorative layer 26 and second underlay layer 28 disposed adjacent the second surface 22 of the substrate 14. The leather decorative layer 26 and underlay 28 are the same as those described above.

A first process for manufacturing the present leather laminated decorative panel 10 involves stacking the backing layer 18, substrate 14, underlay layer 16, and the leather decorative layer 12 and the release sheet on a lay-up station in a superimposed relationship (also referred to as a "build-up"). The physical properties of the release sheet are chosen to ensure the release sheet does not bond with the decorative leather layer or otherwise negatively affect the laminate materials and is typically textured to impart an embossed texture to the decorative layer 12.

The press is typically maintained at a predetermined processing temperature. The build-up is inserted into the heated press. The press is closed and is brought to the laminating pressure. The pressure and temperature are maintained for a "pressing cycle" that usually lasts in the range of about 20 seconds to about 150 seconds. The press is subsequently opened and the build-up, which is now a leather laminated decorative panel 10, is removed. The pressing cycle parameters provided reflect the amount of time, temperature and pressure typically necessary to achieve thermofusion of the various layers forming the decorative panel. The actual parameters may vary for different applications and process equipment.

A second process for manufacturing the leather laminated decorative panel 10 involves providing the backer layer 18, the substrate 14, the underlay layer 16, and the leather decorative layer 12 in the aforesaid superimposed relationship upstream of a continuous press. The press is set up to create the temperature and pressure environment required to bond the layers into the finished decorative panel 10. The line speed of the continuous press is chosen to create a dwell time within the press for the decorative panel 10 that is adequate to ensure proper thermofusion. A release sheet is disposed on the top side of the decorative layer 12 of the build-up prior to entering the press. As stated above, the release sheet, which is contiguous with the leather decorative layer 12, is typically textured to impart an embossed texture to the laminate. The release sheet is typically drawn off after the panel exits the press, and rolled for further handling. The leather laminated decorative panel 10 continues onto downstream handling equipment; e.g., equipment that cuts the continuous decorative panel product into sheets, and handling equipment for the sheets. The continuous press is advantageous because it decreases the processing time of the decorative panels.

In both manufacturing processes, the elevated temperature and pressure environment causes the impregnated resins within the sheets to flow, which consolidates the constituents into the integral leather laminated decorative panel 10. The present leather laminated decorative panel 10 is typically processed at a temperature in the range from about 110° C. to about 250° C., and at a pressure within the range of about 250 psi to about 450 psi. As stated above, the "pressing cycle" usually lasts in the range of about 20 seconds to about 150 seconds.

The following example is illustrative of the present leather laminated decorative panel and does not constitute any limitation with regard to the subject matter of the invention:

EXAMPLE I

A leather laminated decorative panel 10 is manufactured using a non-continuous press. A build-up consisting of a backing layer 18, a substrate 14, an underlay 16, a leather decorative layer 12, and a textured release sheet is made in a superimposed relationship on the lay-up station. The build-up is inserted into the heated press and subjected to a temperature of about 130° C. and a pressure of about 350 psi for a pressing cycle of about 50-60 seconds. After the pressing cycle is completed, the press is opened, the build-up, which is now a leather laminated decorative panel 10, is removed and the release sheet is drawn off.

It will be obvious to those skilled in the art that various changes may be made without departing from the scope of the present invention and that the invention is not to be considered limited to what is described and exemplified in the specification.

What is claimed is:

1. A method for the production of a heat and pressure consolidated leather laminate comprising the steps of:
   setting the temperature of a thermosetting press to a predetermined temperature;
   stacking in a superimposed relationship a backing layer, a substrate, an underlay layer, a decorative layer comprised essentially of leather, and a textured release sheet;
   inserting the stacked, superimposed layers into the thermosetting press;
   increasing the pressure of the thermosetting press to a predetermined pressure;
   maintaining the stacked layers in the heated, pressurized thermosetting press for a period of time sufficient to form a laminate;
   removing the laminate from the thermosetting press; and
   removing the textured release sheet from the laminate;
   wherein the textured release sheet imparts an embossed texture on the decorative layer.

2. The method of claim 1, wherein said predetermined temperature ranges from about 110° C. to about 250° C.

3. The method of claim 1, wherein said predetermined pressure ranges from about 250 PSI to about 450 PSI.

4. The method of claim 1, wherein said period of time sufficient to form a laminate ranges from about 20 seconds to about 150 seconds.

5. A method for the production of a heat and pressure consolidated leather laminate comprising the steps of:
   setting the temperature of the continuous thermosetting press to a predetermined temperature;
   setting the pressure of the press to a predetermined pressure;
   stacking in a superimposed relationship a backing layer, a substrate, an underlay layer, a decorative layer comprised essentially of leather, and a textured release sheet upstream from a continuous thermosetting press;
   feeding the stacked, superimposed layers into the continuous thermosetting press;
   maintaining the stacked layers in the heated, pressurized continuous thermosetting press for a period of time sufficient to form a laminate;

removing the laminate from the thermosetting press; and
removing the textured release sheet from the laminate;
wherein the textured release sheet imparts an embossed texture on the decorative layer.

6. The method of claim 5, further comprising the step of transporting the laminate to handling equipment located downstream from the continuous thermosetting press.

7. The method of claim 5, wherein said predetermined temperature ranges from about 110° C. to about 250° C.

8. The method of claim 5, wherein said predetermined pressure ranges from about 250 PSI to about 450 PSI.

9. The method of claim 5, wherein said period of time sufficient to form a laminate ranges from about 20 seconds to about 150 seconds.

10. A method for the production of a heat and pressure consolidated leather laminate comprising the steps of:
    setting the temperature of the continuous thermosetting press to a predetermined temperature, said predetermined temperature ranging from about 110° C. to about 250° C.;
    setting the pressure of the press to a predetermined pressure, said predetermined pressure ranging from about 250 PSI to about 450 PSI;
    stacking in a superimposed relationship a backing layer, a substrate, an underlay layer, a decorative layer comprised essentially of leather, and a textured release sheet upstream from a continuous thermosetting press;
    feeding the stacked, superimposed layers into the continuous thermosetting press;
    selecting a line speed of the continuous thermosetting press that allows the stacked, superimposed layers to remain in the heated, pressurized press for a period of time sufficient to form a laminate from said layers;
    removing the laminate from the thermosetting press; and
    removing the textured release sheet from the laminate;
    wherein the textured release sheet imparts an embossed texture on the decorative layer.

* * * * *